July 6, 1937.   H. E. McELHENY   2,085,921
PORTABLE LADDER
Filed Oct. 17, 1934   2 Sheets-Sheet 1
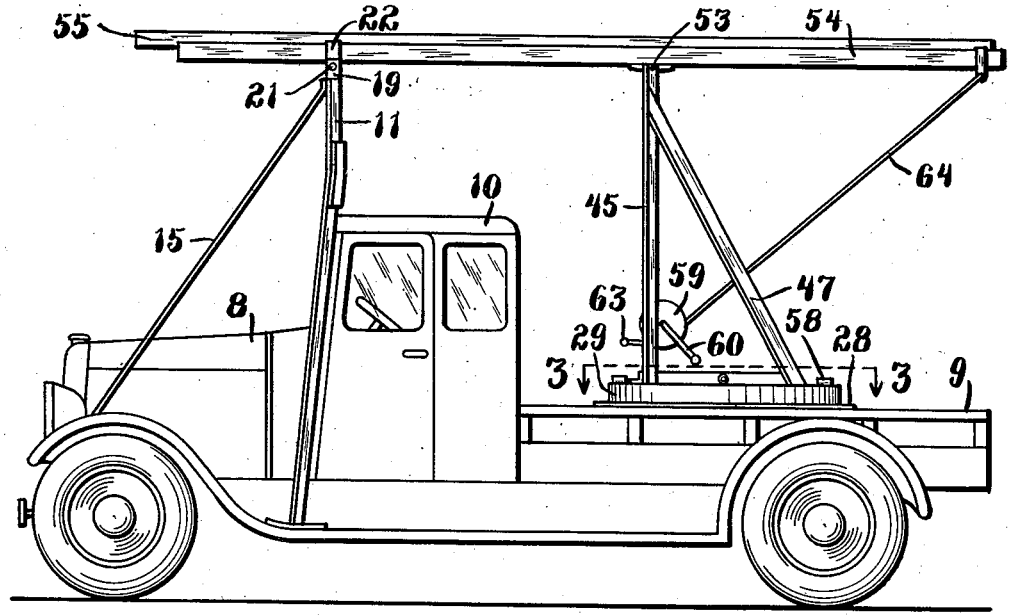
Fig 1
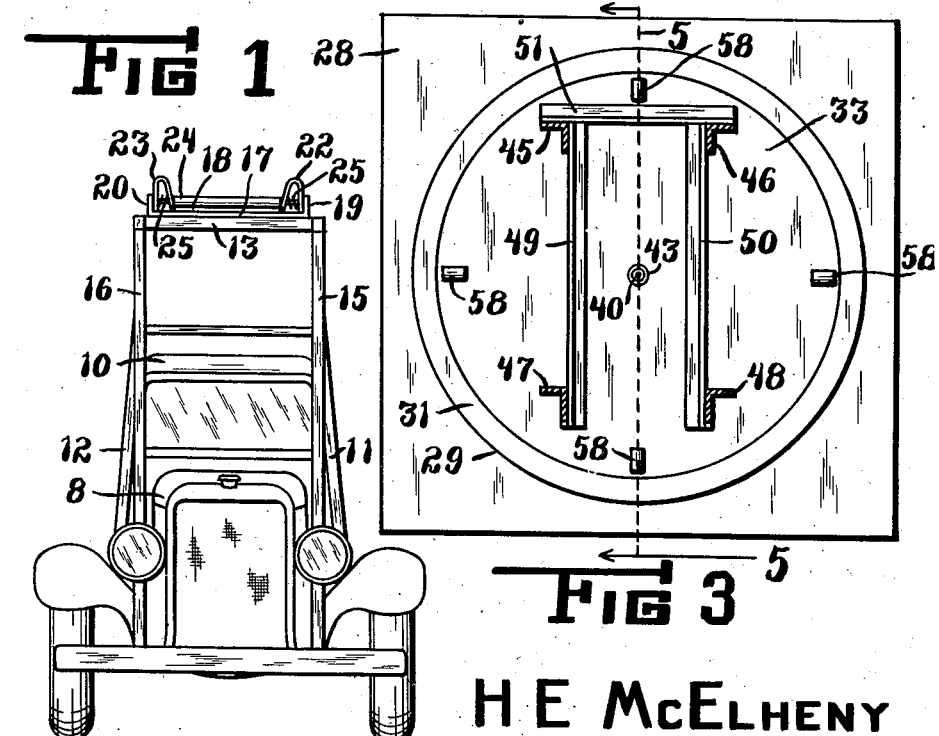
Fig 2
Fig 3
H E McELHENY
INVENTOR
BY F. E. Lannon
ATTORNEY July 6, 1937. H. E. McELHENY 2,085,921
PORTABLE LADDER
Filed Oct. 17, 1934 2 Sheets-Sheet 2
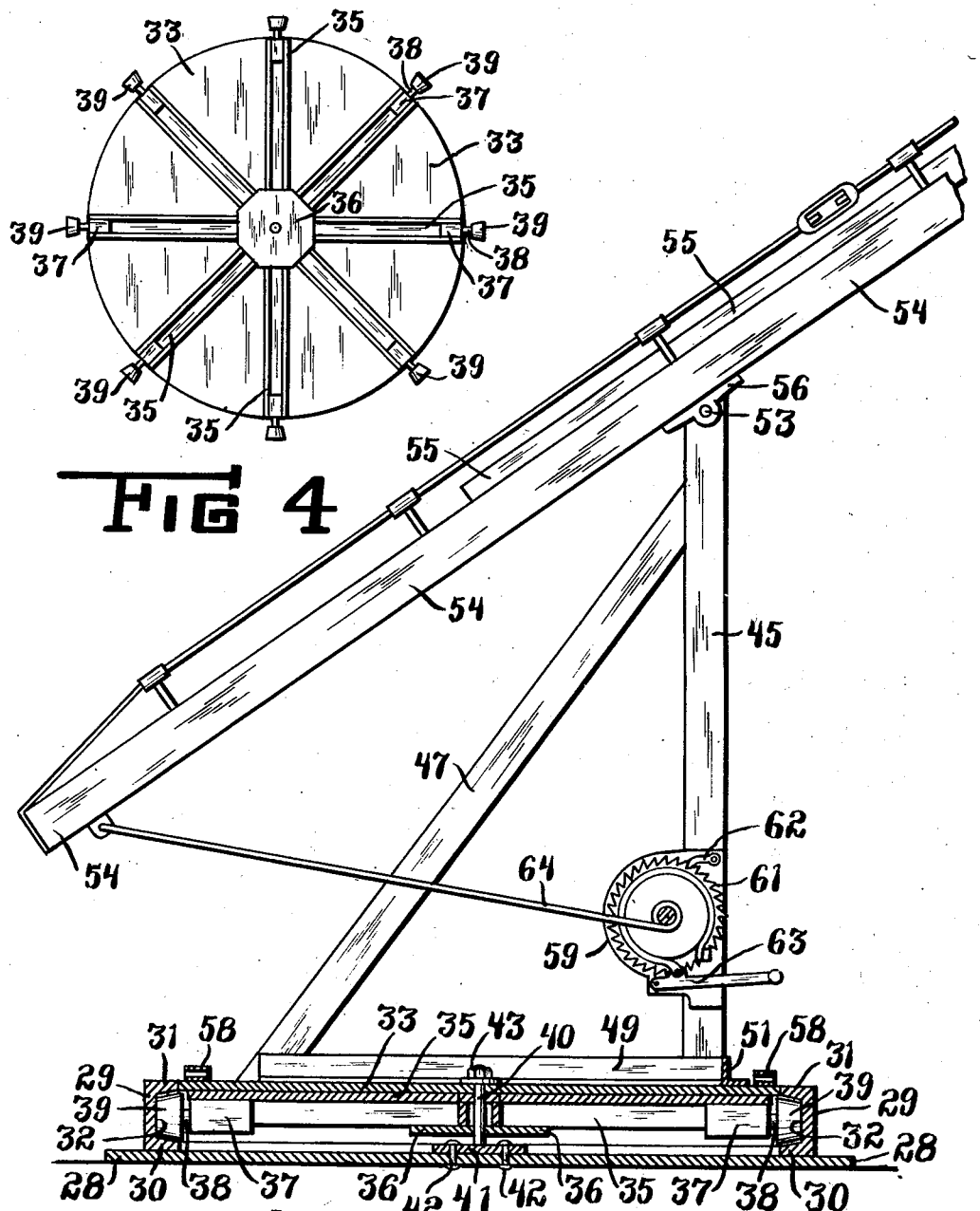
H E McELHENY
INVENTOR Patented July 6, 1937

2,085,921

UNITED STATES PATENT OFFICE 2,085,921

PORTABLE LADDER

Herbert E. McElheny, Cuyahoga Falls, Ohio

Application October 17, 1934, Serial No. 748,678

1 Claim. (Cl. 228—14)

This invention relates to portable extension ladders and consists mainly in improvements in means for rotatably and hingedly mounting a ladder on a truck whereby the same may be moved with the truck to any desired location and easily and conveniently operated to any desired working position.

While adapted for use generally wherever it may be advantageously employed, the invention is particularly intended to provide a ladder mounted on an automobile truck for use in trimming trees.

Objects of the invention are to provide a ladder mounting of simple, durable construction which may be manufactured at a low cost; which will provide conveniently operable, efficient means for moving a ladder to any desired operating position; to provide means for operatively associating the same with an automobile truck or other suitable vehicle and to provide means for securely holding the ladder in a folded position on the vehicle during transit.

The above objects are accomplished and additional ends are attained by the novel construction, combination and arrangement of parts hereinafter described with reference to the accompanying drawings wherein there is shown an illustrative embodiment of the invention, it being understood that the invention is capable of various adaptations and that changes and modifications may be made or resort had to substitutions which come within the scope of the claim hereunto appended.

In the drawings:

Figure 1 is a side elevational view of a combined automobile truck and ladder constructed in accordance with this invention, Figure 2 is a front, elevational view of same, Figure 3 is a horizontal, sectional view taken as indicated by the lines 3—3 of Figure 1, Figure 4 is a plan view of the turn table inverted and, Figure 5 is a vertical, sectional view taken as indicated by the lines 5—5 of Figure 3.

Proceeding now to a detailed description of the invention with reference to the particular adaptation thereof disclosed in the drawings, the numeral 8 denotes an automobile truck which may be of any desired construction. In the drawings there is shown a truck 8 having a body provided with a flat bed 9 and a cab 10. The numerals 11 and 12 denote frame members which are secured to the cab 9 and which project upwardly from the front portion of each side thereof. The frame members 12 and 11 are connected at the top thereof by the cross member 13. In the adaptation of the invention illustrated, the frame members 11 and 12 and the cross members 13 are composed of angle iron.

The numerals 15 and 16 denote braces which are secured to the forward portion of the frame of the truck 8 with each brace secured to the upper end portion of one of the frame members 11 and 12. The numeral 17 denotes a cradle which is secured to the cross member 13 to receive the forward portion of a ladder mounted on the truck as hereinafter described.

The cradle 17 is composed of a strap 18 which is positioned along the upper side of the cross member 13. The opposite ends of the strap 18 are turned upwardly to form the ears 19 and 20 and a bolt 21 is positioned through alined bores in said ears 19 and 20.

The cradle 17 is provided with yielding side members 22 and 23 each of said side members being formed from a flat strip of metal bent in the form of an inverted U and having a bore in the downwardly presented members thereof to receive the bolt 21. The tube 24 is mounted on the bolt 21 and one of the U-members 22 or 23 is mounted between each end of the tube 24 and the adjacent ears 19 and 20.

The numeral 25 denotes coil springs which are mounted on the rod and one of which is positioned between the members of each side member 22 and 23. The outer member of each side member 22 and 23 is substantially vertical while the inner member thereof is inclined inwardly to form tapered sides for guiding the ladder and securely holding the same in a proper position thereon.

The numeral 28 denotes a base plate which is suitably secured to the bed of the truck 8 and the numeral 29 denotes an annular track which is bolted or otherwise suitably secured to the plate 28. The track 29 is provided at the lower edge thereof with an inwardly projecting, circumferentially extending flange 30 and at the upper edge thereof with an inwardly projecting, circumferentially extending flange 31. The flanges 30 and 31 provide a circular track having a circumferentially extending channel 32 on the inner face thereof.

The numeral 33 denotes a turn table which is operatively mounted on the track 29. The turn table 33 is provided with a top plate having reinforcing channel members 35 welded or otherwise suitably secured to the lower face thereof. The strengthening channels 35 extend radially from the center of the plate 33.

The numeral 36 denotes a reinforcing plate which is welded, bolted or otherwise suitably secured to the lower face of the members 35. The plate 36 is positioned centrally of the turn table 33 and serves to support and strengthen the inner ends of the members 35. Each member 35 is provided at the outwardly projecting end thereof with a block 37 which is welded or otherwise suitably secured between the flanges of said channel member. A spindle 38 projects outwardly from each block 37. A wheel 39 is operatively mounted on each spindle 38. The wheel 39 is preferably formed with a conical face which is adapted to correspond to the upper and lower walls of the channel 32. The wheels 39 are smaller in diameter than the width of said channel whereby the wheels 39 will operate on either the flanges 30 or 31 as hereinafter described.

The turn table 33 is positioned on the track 29 with the table 33 positioned in the same plane with the upper face of the flange 31 and with the wheels 39 positioned in the channel 32.

The plates 33 and 36 are provided with an axial bore which also extends through the intervening reinforcing channels 35 and which is adapted to receive the king-pin 40 which projects upwardly from the plate 41 which is secured to the central portion of the plate 28 by means of the bolts 42 or other suitable fastening means. The upper end of the king-pin 40 is threaded and the nut 43 is operatively secured thereon to limit the upward movement of the turn table 33 relative to the plate 29.

The numerals 45, 46 denote upright frame members which are secured to the plate 33 so as to project upwardly therefrom. The numerals 47 and 48 denote braces which are inclined upwardly from the opposite edge portion of the plate 33 and are suitably secured to the posts 45 or 46 to hold the same in a rigid position. The posts 45 and 46 and the braces 47 and 48 are preferably composed of angle iron. The numeral 49 denotes an angle iron reinforcing member which extends between the posts 45 and 47 and which is welded or otherwise suitably secured to the plate 33 and to the posts 45 and 47. The numeral 50 denotes a similar angle iron which is likewise secured to the plate 33 and the posts 46 and 48. The numeral 51 denotes a similar reinforcing member which is likewise secured to the plate 33 and the posts 45 and 46.

The posts 45 and 46 project upwardly beyond the upper end of the braces 47 and 48 in parallel, spaced relation to each other and are provided on the upper ends thereof with alined bores in which is mounted a shaft 53. The numeral 54 denotes a ladder which may be provided with a suitable extension section 55. The ladder 54 is provided intermediate its length on the lower side of each stile thereof with a bracket 56 having a bearing in which is received the shaft 53 to hingedly secure the ladder between the upper ends of the posts 45 and 46.

The plate 33 is provided on the upper face thereof with radially directed, tubular members 58 which are welded or otherwise secured thereto to provide sockets in which a bar may be inserted to turn the table 33 on the track 29.

The numeral 59 denotes a winch which is provided with a suitable crank 60, ratchet wheel 61, pawl 62 and brake 63. A cable 64 is operatively wound on the drum of the winch with the other end thereof secured to the rear end portion of the ladder 54 whereby the winch may be operated to pull the rear end of the ladder downwardly and raise the other end thereof.

When not in use or in transit, the table 33 is turned to position the forward portion of the ladder in the cradle 17. To use the ladder the winch is operated to raise the forward end of the ladder to the desired inclination. The extension ladder is then raised and the table 33 rotated to bring the ladder to a desired working position. It will be seen that with the ladder fully extended the wheels 39 on one side of the table 33 will operate on the lower flange 30 of the track 29 while the wheels 39 on the upper side thereof will operate against the upper flange 31.

It will thus be seen that I have provided a truck having a ladder rotatably and hingedly mounted thereon whereby it may be swung in any desired direction and positioned at any desired inclination without upsetting the truck.

Having thus illustrated my invention and described the same in detail, what I claim as new and desire to secure by Letters Patent is:—

In apparatus for mounting a ladder on a track, a circular track secured thereto; said track composed of a channel member having flanges projecting inwardly from the upper and lower side edges thereof, a turn table comprising a disk fitted within said track with the upper faces of the track and disk disposed in the same horizontal plane; a plurality of radially arranged reinforcing members secured to the lower face of said disk, a spindle projecting outwardly from each reinforcing member; a wheel on each spindle, said wheels positioned between and being adapted to operate in contact with either of said flanges, a king pin for holding said turntables in a central position on said track; a frame secured to and projecting upwardly from said turn table, a ladder hingedly mounted on said frame for vertical swinging movement and a winch on said frame for raising and lowering said ladder.

HERBERT E. McELHENY.